United States Patent [19]

Krubert

[11] Patent Number: 4,578,273

[45] Date of Patent: Mar. 25, 1986

[54] PRINTING OF FOODS

[75] Inventor: George J. Krubert, Niles, Ill.

[73] Assignee: Keebler Company, Elmhurst, Ill.

[21] Appl. No.: 251,869

[22] Filed: Apr. 7, 1981

[51] Int. Cl.$^4$ .................. A23G 3/00; A21D 13/08; A23P 1/08; A23L 1/275
[52] U.S. Cl. ........................................ 426/87; 426/94; 426/103; 426/104; 426/383; 426/249; 426/250; 426/303; 426/572; 426/659
[58] Field of Search .................. 426/383, 87, 94, 249, 426/250, 302, 303, 304, 659, 103, 572, 104; 118/13, 14, 18, 16; 101/41

[56] References Cited

U.S. PATENT DOCUMENTS

| | | |
|---|---|---|
| 3,052,552 | 9/1962 | Koerner . |
| 3,215,536 | 1/1965 | Simeone et al. . |
| 3,446,143 | 5/1969 | Williamson .......................... 101/201 |
| 3,537,406 | 11/1970 | Ort ...................................... 426/383 |
| 3,699,879 | 10/1972 | Ritler ................................... 118/13 |
| 3,852,494 | 12/1974 | Williamson .......................... 426/383 |
| 3,858,545 | 1/1975 | Fisher .................................. 118/13 |
| 4,019,436 | 4/1977 | Handweiler et al. ................. 101/41 |
| 4,285,978 | 8/1981 | Quinlivan ............................ 426/383 |

FOREIGN PATENT DOCUMENTS 1441446 6/1976 United Kingdom .

OTHER PUBLICATIONS

Icing & Decorating Machine, AMF.
Food Products Formularly, vol. 2, Avi Publ., 1975, Tressler et al.
Biscuit & Cracker Production, 1st Ed., 1957, Bohn, Amer. Trade Publ. Co.
Baking Science & Technology, Siebel Publ., vol. II, 1973, Pyler.

Primary Examiner—Steven Weinstein
Attorney, Agent, or Firm—Lockwood, Alex, FitzGibbon & Cummings

[57] ABSTRACT

A method of forming a printed food or baked product, and the product itself comprises forming a hard, non-porous icing surface by drying an icing mixture and printing one or more edible inks on the hard surface of the icing using a printing pad having an edible silicone oil therein. The icing may be in the form of a coating on a hard baked product. The specific gravity of the icing mixture before drying is between about 1.0 and 2.5 and, preferably, between about 1.05 and 1.5. The hard baked product has a finished moisture of between about 2-10% by weight of the finished baked product and, preferably, between about 2-8% by weight.

17 Claims, 8 Drawing Figures

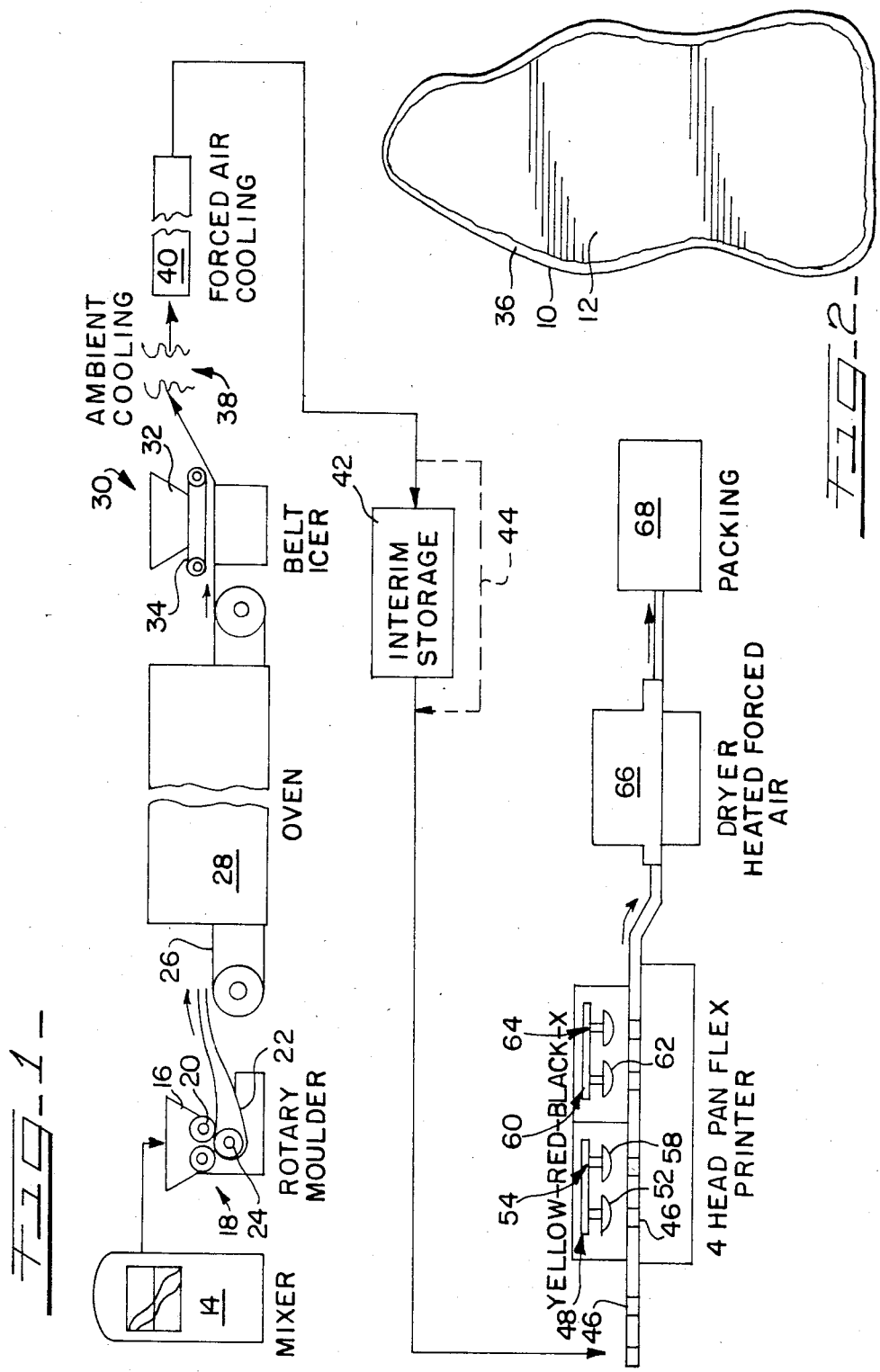

FIG_3_  FIG_4_  FIG_5_
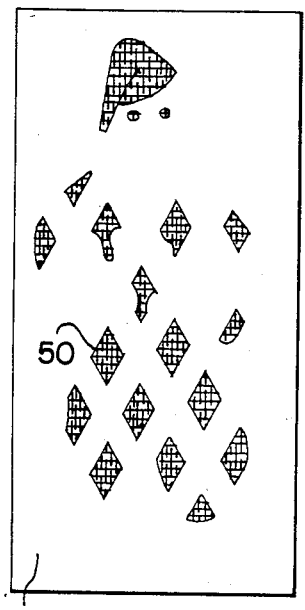
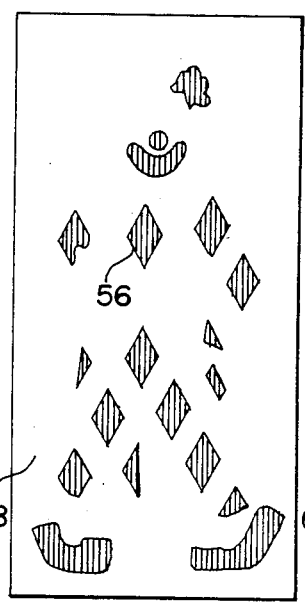
FIG_3A_  FIG_4A_  FIG_5A_
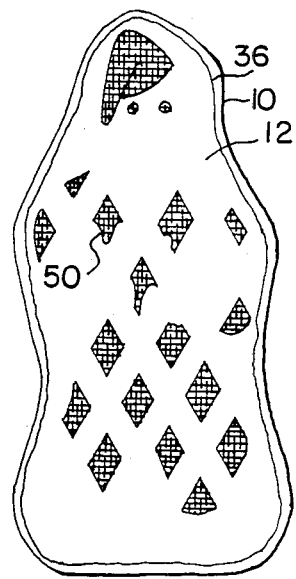
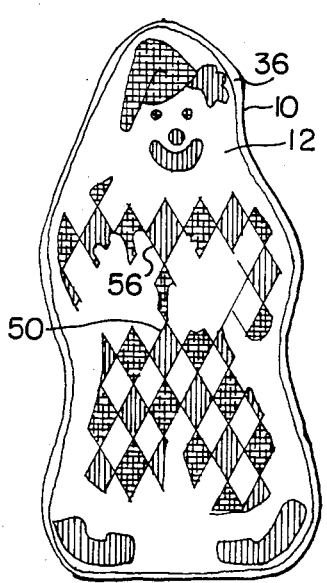
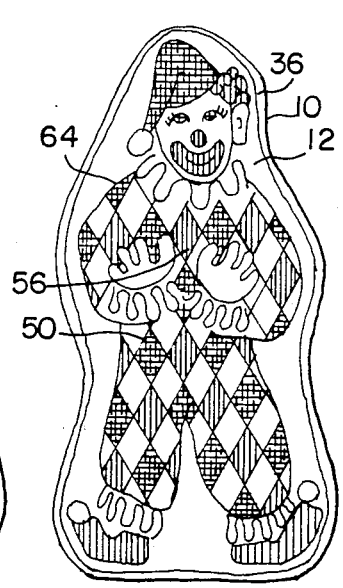

PRINTING OF FOODS

BACKGROUND AND SUMMARY OF THE INVENTION

This invention relates to the printing of foods and the products so printed and, more particularly, to a method of printing foods, such as iced baked goods, and the product thereof.

In the past various methods have been employed for the forming of designs or other figures on baked products. One such method has incorporated a silk screening procedure for imparting a design to cookies and other products prior to the baking of the products. Another method has employed spraying or squirting various coloring agents upon the product after baking to form a design much like, by way of example, the application of floral and other decorations to birthday cakes.

Both of these prior methods have several disadvantages. One disadvantage is that the application of the coloring agents to the products are hard to control and, thus, do not lend these methods to mass production techniques or uniform results. Another problem with both methods is that they are subject to smearing or blotting due to the consistency of the coloring agents, the methods of application, and the nature of the product to which they have been applied. Another disadvantage of the prior silk screening technique is that close tolerances are necessary in the machinery performing the method, thus rendering the machinery relatively expensive and requiring special design and construction for the decorating of foods.

The present invention overcomes each of the several disadvantages of these prior techniques. In the present invention, edible inks may be transferred to a hard icing by a printing method, not unlike standard printing techniques employed in the industry for other non-food products. The use of such standardized printing techniques is subject to easy control and smearing or blotting of the inks can be avoided. In the preferred method and product of the present invention, essentially standardized printing machinery used generally throughout the printing industry may be employed without substantial modifications to the structure of the machinery, thus, substantially reducing the capital investment necessary to practice the method and form the products of the present invention. A number of inks of differing colors may be easily and rapidly printed upon a given product without runs, smearing or blotting to produce a striking final product of multicolor design. In the present invention an icing and ink combination has been discovered which avoids blotting of the ink, results in excellent adherence of the inks, and minimizes the breaking of the surface printed, the latter of which might otherwise result in damage to the product or fouling of the printing equipment or both.

In one principal aspect of the present invention, a method of forming a printed food product comprises the steps of shaping an icing mixture to form a surface, drying the icing mixture to form a hard, non-porous icing surface, transferring by printing at least one edible ink to the hard surface of the icing, and drying the ink.

In another principal aspect of the present invention, the icing mixture before drying has a specific gravity of between about 1.0 and 2.5 and, preferably, between about 1.05 and 1.5.

In still another principal aspect of the present invention, the icing may be formed on a substantially flat surface of a hard baked product prior to printing.

In still another principal aspect of the present invention, a printed food product comprises a dried, hard, non-porous icing having a surface dried from an icing mixture, and an edible ink printed on said surface.

In still another principal aspect of the present invention, the hard, non-porous icing is dried from an icing mixture having a specific gravity of between about 1.0 and 2.5 and, preferably, between about 1.05 and 1.5.

In still another principal aspect of the present invention, the icing of the product may be coated upon a substantially flat surface of a hard baked product prior to printing.

These and other objects, features and advantages of the present invention will be fully understood upon a consideration of the following detailed description.

BRIEF DESCRIPTION OF THE DRAWINGS

In the course of this description, the drawings will be frequently referred to in which:

FIG. 1 is a schematic diagram of a preferred embodiment of method according to the principles of the present invention;

FIG. 2 is a plan view of an iced baked cookie which has been formed by the first part of the schematic process shown in FIG. 1 and which is ready for printing in accordance with the principles of the present invention;

FIGS. 3 and 3A are the plan views of a printing pad having a first color thereon, ready to be transferred to the icing surface, and the first design having been transferred to the iced surface, respectively;

FIGS. 4 and 4A are identical to FIGS. 3 and 3A, except that the printing pad in FIG. 4 has a second color thereon waiting to be transferred to the icing surface and in FIG. 4A the second color has been transferred to the icing surface and combined with the first color design already on the cookie shown in FIG. 3A; and FIGS. 5 and 5A are identical to FIGS. 4 and 4A, except that the printing pad in FIG. 5 has a third outline color ready to be transferred to the icing surface, and in FIG. 5A the third color has been transferred to the icing surface in combination with the first two colors already on the cookie shown in FIG. 4A.

DESCRIPTION OF THE PREFERRED EMBODIMENTS

In FIG. 1 a schematic is shown of the preferred method of the present invention, beginning with the making of a baked product, such as a cookie, from its initial ingredients to the final packing of the product printed in accordance with the principles of the present invention. In general, the present invention is described in terms of a baked cookie 10 having a hard, non-porous icing coating 12 thereon, as shown in FIG. 2, and upon which a design, as shown in FIGS. 3A, 4A and 5A, is sequentially printed upon the icing coating.

The baked cookie 10 is preferably of a shortbread type composition. The doughs are mixed in a conventional bakery mixer 14, as shown in FIG. 1, until a uniform dough consistency exists. The type of dough preferred in the present invention is generally referred to in the baking art as a rotary type dough which has a non-sticky consistency and which is capable of being formed into specific shapes under pressure.

After mixing, the dough is transferred to the hopper 16 of a rotary moulder 18 as shown in FIG. 1. The rotary moulder 18 is also of a conventional type used in the baking industry and is equipped with one or more engraved dies 20. The dough is forced into the die cavities and the dies rotate into contact with a canvas apron 22 supported upon a hard rubber roll 24. As pressure is exerted by the rubber roll against the canvas apron and the rotating die, a suction is created between the apron and the shaped dough in the die is transferred from the die to the apron. The apron 22 moves in a conveyer fashion to deposit the shaped dough onto another conveyer 26 which passes the shaped dough into the oven 28 to be baked.

After the baked dough leaves the oven 28 it passes to a belt icer, generally 30. The icing mixture is applied from a hopper 32 of the belt icer to a belt 34. The icing mixture is viscous and clings to the belt and, as the baked dough passes under the belt 34 which is coated with the viscous icing mixture, the icing mixture is transferred onto to flat surface 36 of the baked dough as shown in FIG. 2. The belt 34 of the belt icer is preferably one which is referred to as a "poly belt" which is a polyurethane ester having a butyl rubber face which is a white, non-porous, non-absorbent surface. Such a surface is non-adhesive in nature, allowing ready transfer of the icing mixture to the baked dough surface 36.

Although a belt icer is shown, other forms of applying the icing to the cookie surface may be employed. Such types of icing devices and methods are well within the skill of one in the art. For example, a spray icer may be used in place of the belt icer.

The amount of icing mixture applied to the baked dough surface may be varied over a wide range of thicknesses. The thickness of the icing mixture on the baked dough surface varies with the pressure between the dough surface and the belt and the viscosity of the icing mixture. The icing mixture can be applied either to the baked dough in hot or cool condition. The hotter the baked dough, the faster the icing dries.

Following icing, the iced baked product may be cooled and the icing mixture dried to a hard consistency either by ambient cooling 38 or forced air cooling 40 or a combination of both. After cooling and hardening, the iced product may either be held in interim storage 42 or by-passed, as shown at 44, directly to the next step, the printing step.

To print the iced baked dough, each cookie is individually manually placed into a moving mandrel 46. The mandrels 46 move along the length of the printing machine in an intermittant motion, each movement of a mandrel constituting a cycle. Cycles of three second intervals have been found to be sufficient utilizing the inks which will be later described.

At the first print station 48 one of the ink colors is transferred to the hardened iced surface 12. For example, the color of ink which is printed in the first station may be yellow. The design 50 to be printed at the first print station is contained on an engraved hardened tool steel plate (not shown). The ink is applied to the plate and is squeegeed with a doctor blade to leave the etched ink design remaining on the plate and remove excess ink.

This design 50 is then removed intact by contacting the plate with a silicone pad 52 to which the inked design will adhere. From this pad 52, the design is then transferred to the flat surface of the icing 12 to form the first color element of the overall design to be printed upon the product. Referring specifically to FIG. 3, the pad 52 with the design elements 50 thereon is shown. In FIG. 3A, the design elements 50 have been shown transferred to the flat surface of the icing 12.

After the inked design 50 has been transferred by the pad 52 at the first printing station 48, the mandrel 46 with the product therein is then cycled to the second printing station 54 where the next inked design elements 56, as shown in FIG. 4, are transferred first from the engraved plate to the pad 58 and from the pad 58 as shown in FIG. 4, to the hard icing surface 12 to combine with the design 50 already printed upon the icing surface, as shown in FIG. 4A. By way of example, the ink transferred to the surface at station 54 may be red.

The mandrel 46 with the product now having both designs 50 and 56 imprinted thereon is again cycled, this time to the third printing station 60. At this station, the pad 62 transfers still a third colored ink design 64 from the engraved plate to the hard icing surface 12. This design may, for example, be a black outlining to complete the body, hands and face of the overall design. This black outline design 64, as shown on the pad in FIG. 5, is transferred and combined with the two designs already imprinted upon the product to complete the overall design, as shown in FIG. 5A, on the surface of the icing 12.

Although three distinct ink colors and color stations have thus far been shown and described, it will be understood that the appearance of the final product will actually show a 4-color presentation because certain areas of the icing surface may be left unprinted but will lie within the outline design 64. It will also be understood that additional printing stations and colors may be incorporated in the overall printed design, as shown by the fourth printing station 64 in FIG. 1, which has been marked "X" as the color.

Once the entire design has been imprinted upon the product, the printed product is dried, for example, in a forced air drying tunnel 66 as shown in FIG. 1, and then proceeds to a packing station 68. It has been found that with the particular inks later described, the fully printed product can be dried for 5-10 at a temperature of 200°-400° F. in the tunnel. After drying, the product is ready for packaging in approximately 20-40 seconds.

An important feature of the present invention is the discovery that the icing mixture before drying and hardening must have a specific gravity of between 1.0 and 2.5 and, preferably, between 1.05 and 1.5 in order to facilitate handling and achieve a high quality printed design. The specific gravity of the icing mixture is carefully controlled by appropriate selection of the viscosity control agents in the icing mixture and the manner of mixing the icing mixture in the belt icer 30 prior to application to the baked product. Both of these parameters determine the amount of air which is incorporated into the icing mixture which determines the specific gravity of the mixture. This specific gravity, in turn, determines the porosity of the hard icing after drying. If the specific gravity of the icing mixture is too low, it will become porous and overly brittle upon hardening and will flake off of the baked product surface 10 during printing, causing unprinted depressions in the hardened surface and fouling of the printing pads. Improper specific gravity of the icing mixture and porosity of the hardened surface will also impair adherence of the inks to the icing.

By way of specific example, a Cowels high shear mixer, Model No. 510 VHV, having a speed of 3500 rpm and a standard 15 in. impeller for that model may be used to mix the icing mixture having the formula to be described later. Mixing is continued for about 3 minutes until the icing mixture has attained a homogenous mass. Such mixer and mixing times have been used successfully with the icing formula to be later described to realize the desired specific gravities.

Also by way of example, an icing mixture or formula having the following ingredients has been found to be satisfactory with the last described mixer.
Gelatin (225 Bloom): 2.6 lbs.
Water (180° F.): 38.5 lbs.
Powdered Sugar: 200 lbs.
Water (180° F.): 38.5 lbs.
Powdered Sugar: 150 lbs.

The gelatin is first added to the first amount of hot water in the mixing tank. The first batch of powdered sugar is mixed for about 2 minutes into the gelatin-water mixture. The remaining water and powdered sugar is then added to the tank and the entire batch of icing is mixed for about 3 minutes more.

The gelatin in the above formula is the viscosity control agent. It will be understood that other control agents may be incorporated, either together with the gelatin or as the sole viscosity control agents without departing from the invention. Examples of other viscosity control agents are agar, locust bean gum, guar gum, gum arabic, sodium carboxymethyl cellulose and pectin.

It will also be understood that other icing formulas and/or mixers and mixing conditions may be employed without departing from the scope of the invention. What is important is that whatever icings and mixing equipment or conditions are employed, they should result in the specific gravities stated herein for the iced product.

The term "hard" as employed herein in reference to the dried icing surface, is intended to mean sufficient hardness so as to withstand deformation by the pressures exerted by the printing pads 52, 58 and 62. Obviously, such hardness is harder than soft icings which, for example, can be found on cakes. Such icings would clearly be deformed by the printing pads. Aside from the concern of deformation, the hardness of the icing surface is not otherwise particularly critical.

By controlling the specific gravity of the icing mixture which is ultimately dried to the hardened surface upon which the inks are printed, conventional printing machines and equipment readily available on the market may be used for the printing operation with only minor changes. By way of example, a suitable printing machine is produced by Autoroll Dennison and identified as its 4-head Pad Flex CL42T automatic pad transfer printer. The only revision that need be made in this conventional printing machine is to utilize edible silicone oils in the silicone printing pads 52, 58, 62 in place of the conventional silicone oils normally utilized in such printing pads. Such edible silicone oils are necessary because minute trace quantities of the oil may be transferred to the food product during printing.

The printing pads themselves, 52, 58 and 62, are formed of extremely soft, resilient silicone material and, thus, are capable of flexing during printing. The printing surfaces of the pads are somewhat domed as shown in FIG. 1 to prevent the creation of a suction upon contacting the hardened icing surface which might otherwise lift the product from the mandrels 46 as the pads are retracted after each design element is printed.

The inks which are used in the method and product of the present invention must comply with FD&C standards, be colorfast and preferably have brilliant colors. They also are preferably non-water soluble. They should also exhibit superior transfer and adherence qualities to the icing product upon which they are printed and should cure or dry quickly upon being transferred to the icing.

By way of example, a suitable yellow ink is Opacode S-1-2123 which contains FD&C yellow No. 5; red is Opacode S-1-1652 which contains FD&C red No. 3 and yellow No. 6; and black is Opacode S-1-8057 which contains FD&C blue No. 2, yellow No. 6 and red No. 3. Each of these inks is available from Colorcon, Inc., West Point, Pa. and each is fully FD&C approved. These inks include various non-aqueous solvents and other FD&C approved ingredients, including titanium dioxide pigments, purified shellacs, propylene glycol, lecithin and SDA-3A alcohol to form uniform stable dispersions.

The dough compositions suitable for the present invention may be generally widely used compositions such as shortbread type cookie doughs. A suitable dough composition by way of example is as follows:
Oleo (Hot): 350 pounds
Flavorup butter: 15 pounds
Lecithin: 0.5 pounds
Hyskor butter flavor 2.5 pounds
Granulated Sugar: 350 pounds
Dairy Whey: 20 pounds
Vanilla Sugar: 2.5 pounds
Salt: 15 pounds
Imitation Lemon Oil: 0.75 pounds
Water: 50 pounds
Ammonia (with water): 1.25 pounds
Mich. special flour: 1,000 pounds
Sodium Bicarbonate: 3 pounds
Phospholac: 1.5 pounds The ingredients of the dough may also be varied to vary the desired finished eating characteristics of the baked product.

After baking, the product moistures of the baked product prior to icing may be in the range of 2-10%, and preferably are 2-8% by weight of finished baked product. Moistures of higher percentages generally result in a more fragile baked product which may be subject to breakage during printing and may reduce the quality of the baked product.

Although the present invention has been described in terms of the printing of an icing on a baked product, the invention should not be limited to baked dough products. The principles of the invention could be practiced on a product which is formed completely of the icing material having the proper hardness, non-porosity and specific gravity as taught herein. Thus, the term "icing" as used herein is intended to be broad enough to include other forms of edible icing type food products which might be formed of somewhat different materials which are capable of forming the entire product itself. The term "icing" as used herein is intended to refer to icing-like materials which display the general physical characteristics of low porosity, hardness and specific gravity previously described, are somewhat brittle in nature upon drying, but have sufficient strength and hardness to be receptive to printing employing the general techniques described herein.

The embodiments of the present invention which have been described are merely illustrative of a few of the applications of the principles of the invention. Numerous modifications may be made by those skilled in the art without departing from the true spirit and scope of the invention.

What is claimed is:

1. A method of forming a printed food product comprising the steps of:
   forming an icing mixture having a specific gravity of between 1.0 and 2.5,
   shaping said icing mixture to have a surface,
   drying said icing mixture to form a hard, non-porous icing surface,
   transfer printing at least one edible ink to said hard dried surface of said icing, and
   drying said ink.

2. The method of claim 1, wherein the specific gravity is between about 1.05 and 1.5.

3. The method of claim 1 wherein said ink is printed onto said hard icing surface by transferring said ink from a pad having an edible silicone oil therein.

4. The method of claim 1 wherein a plurality of inks of different colors are transferred by printing to said hard icing surface.

5. The method of claim 1, wherein said icing mixture is coated on a substantially flat surface of a hard baked product, said hard surface of said icing also being substantially flat.

6. The method of claim 5, wherein said hard baked product has a finished mositure of between about 2–10% by weight of the finished baked product.

7. The method of claim 6, wherein said finished moisture is between about 2–8% by weight of the finished baked product.

8. The method of claim 7, wherein the specific gravity of said icing mixture is between about 1.05 and 1.5.

9. The method of claim 7, wherein a plurality of inks of different colors are transferred by printing to said icing surface.

10. A printed food product comprising:
    a dried, hard, non-porous icing having a surface dried from an icing mixture having a specific gravity of between 1.0 and 2.5 before drying, and at least one edible ink transfer printed on said surface.

11. The product of claim 10, wherein the specific gravity is between about 1.05 and 1.5.

12. The product of claim 10, wherein a plurality of inks of different colors are printed on said icing surface.

13. The product of claim 10, including a hard baked product having a substantially flat surface, said icing coating said flat surface and also having a substantially flat surface to which said ink is transferred by printing.

14. The product of claim 13, wherein said hard baked product has a finished moisture of between about 2–10% by weight of the finished baked product.

15. The product of claim 14, wherein said finished moisture is between about 2–8% by weight of the finished baked product.

16. The product of claim 15, wherein the specific gravity of said icing mixture is between about 1.05 and 1.5.

17. The product of claim 15, wherein a plurality of inks of different colors are printed on said surface of said hard icing surface.

* * * * *

UNITED STATES PATENT AND TRADEMARK OFFICE
CERTIFICATE OF CORRECTION

PATENT NO. : 4,578,273
DATED : March 25, 1986
INVENTOR(S) : George J. Krubert

It is certified that error appears in the above—identified patent and that said Letters Patent is hereby corrected as shown below:

Column 4, line 40 - insert --seconds-- after 5-10.

Signed and Sealed this

Eighth Day of July 1986

[SEAL]

Attest:

DONALD J. QUIGG

Attesting Officer

Commissioner of Patents and Trademarks